May 28, 1963  M. L. ROBINSON  3,091,013
APPARATUS AND METHOD FOR FORMING MONOLITHIC PIPE
Filed Dec. 27, 1960  5 Sheets-Sheet 5
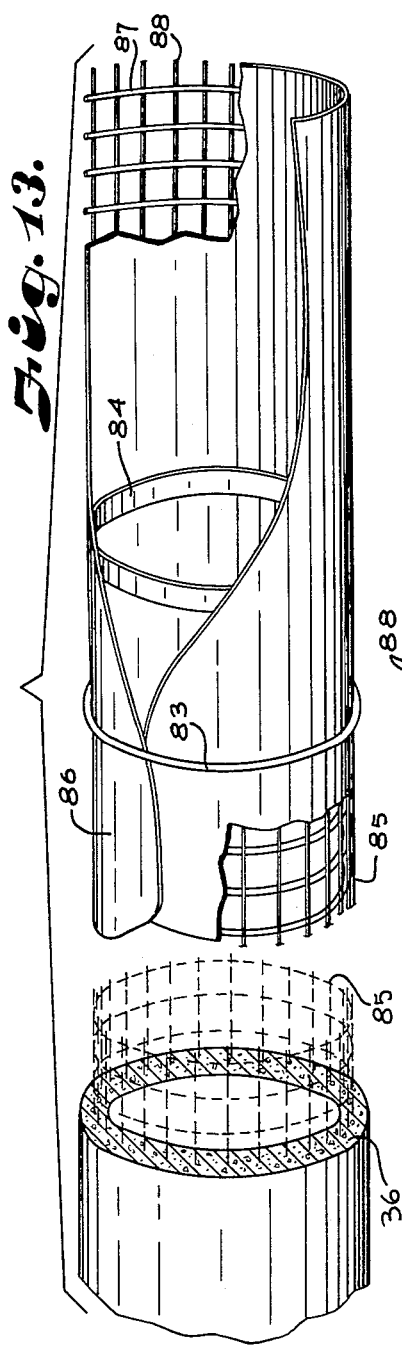
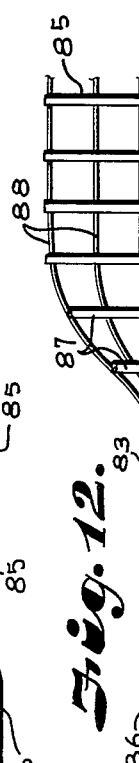
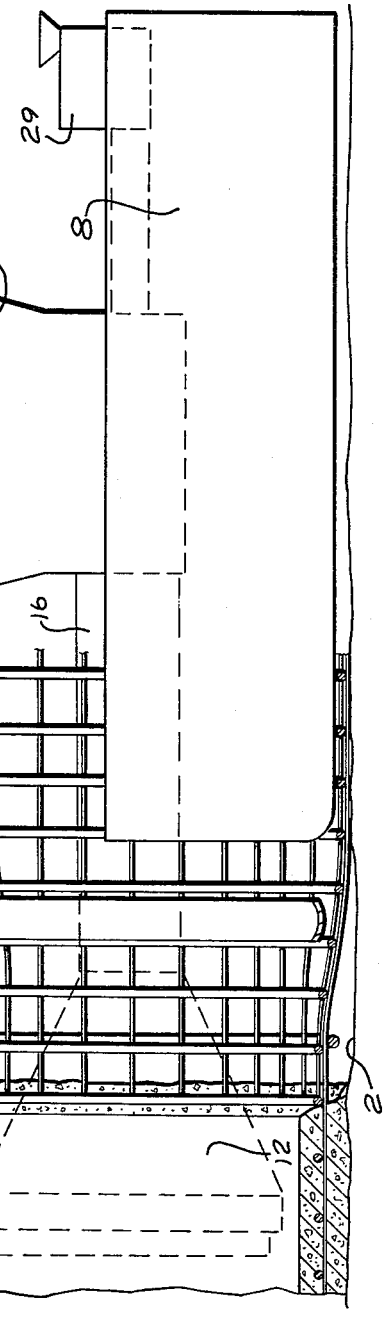
INVENTOR.
MOTT L. ROBINSON
BY
Fishburn & Gold
ATTORNEYS

United States Patent Office 3,091,013
Patented May 28, 1963

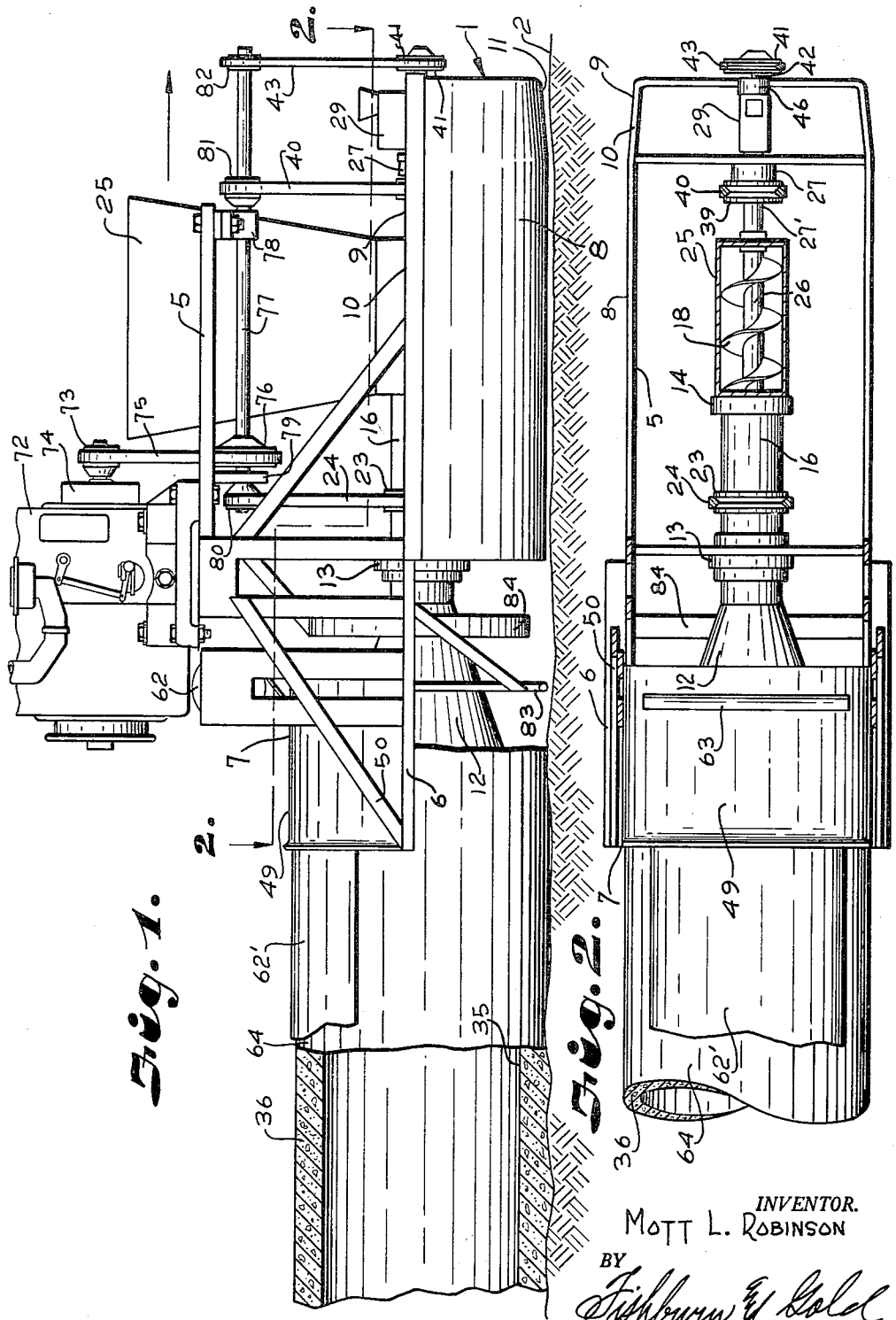

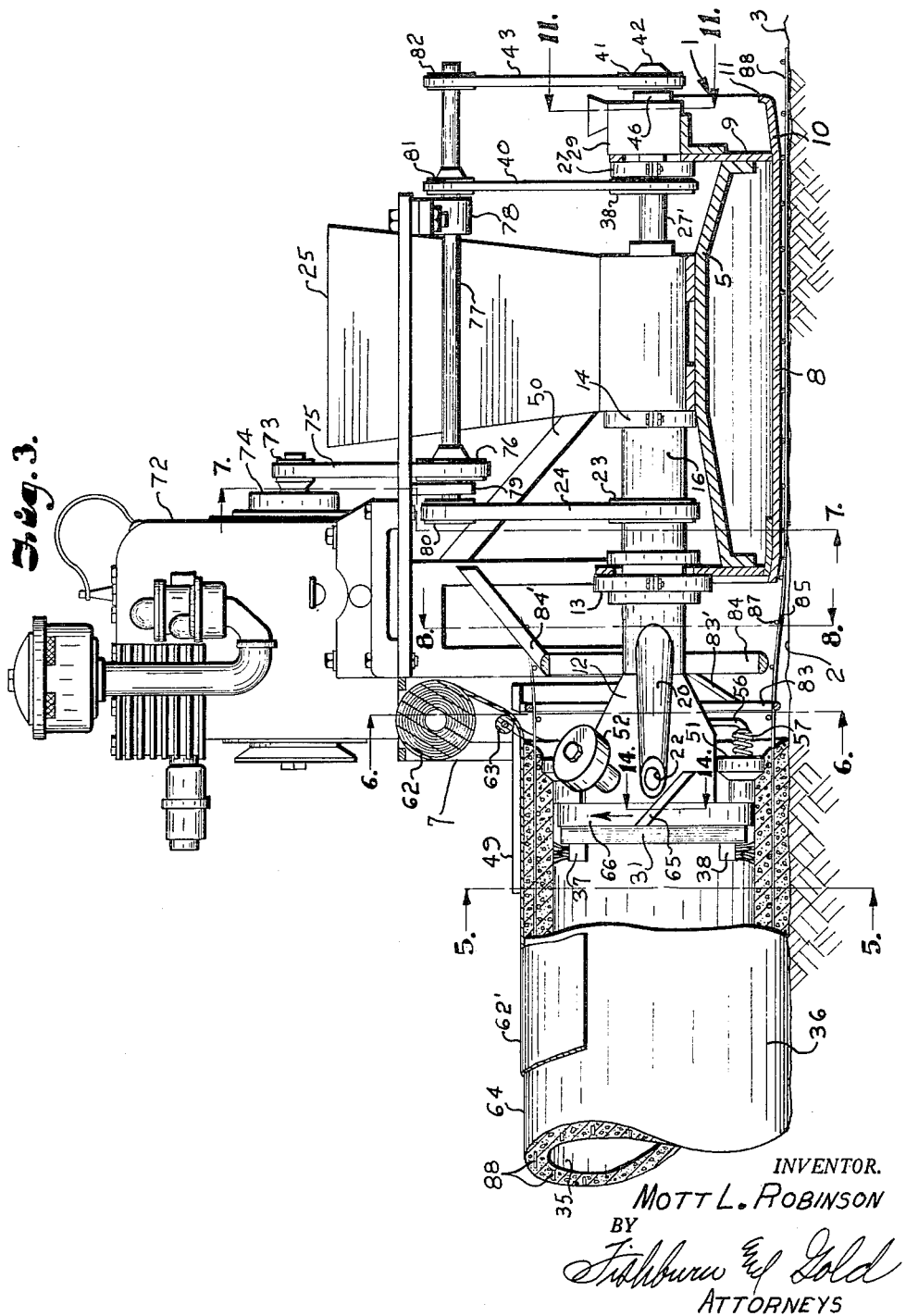

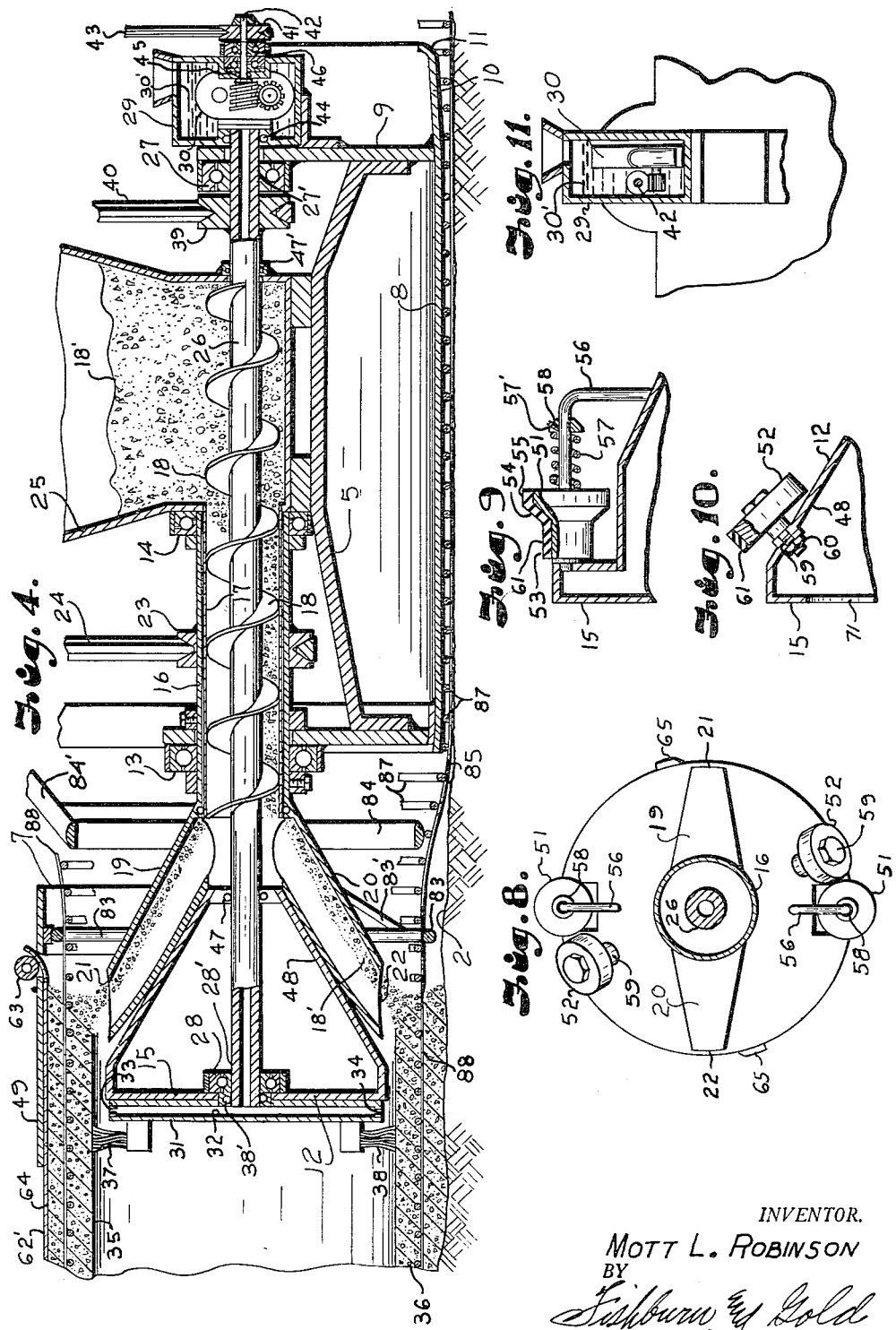

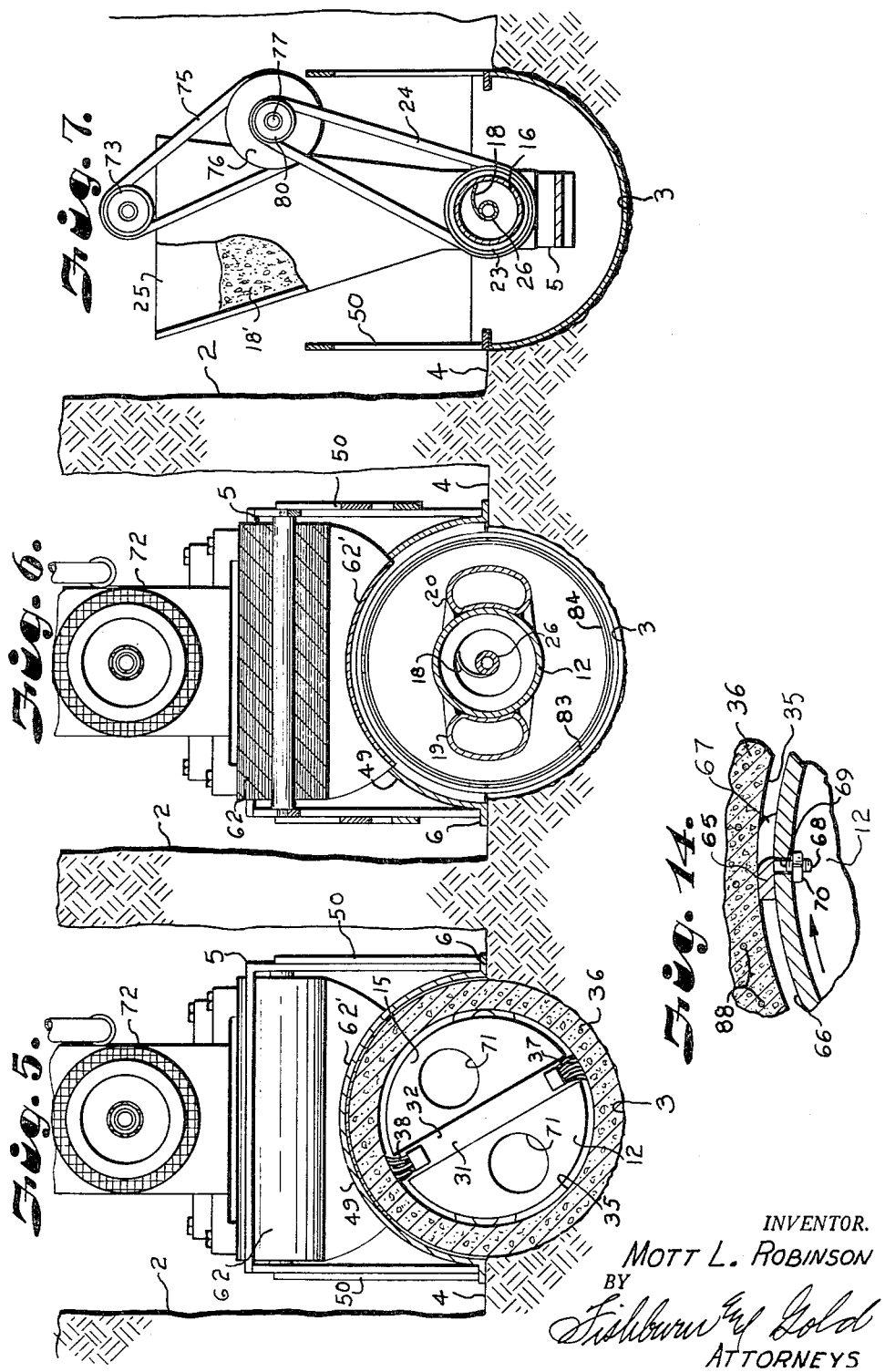

3,091,013
APPARATUS AND METHOD FOR FORMING
MONOLITHIC PIPE
Mott L. Robinson, Lakin, Kans.
Filed Dec. 27, 1960, Ser. No. 78,704
9 Claims. (Cl. 25—32)

This invention relates to an apparatus and method for forming continuous or monolithic pipe in the bottom of a previously excavated open ditch, said pipe being formed with or without wire reinforcing embedded therein and without stationary forms.

The principal objects of the present invention are: to provide an improved apparatus adapted to be moved in a previously excavated open ditch while extruding high density concrete monolithic pipe; to provide such an apparatus which may be propelled along the ditch by the force exerted against the exuding pipe; to provide such an apparatus having guide runners thereon adapted to contact lateral ledges formed in the ditch for accurately guiding the apparatus along the intended pipe path; to provide such an apparatus which accepts reinforcing wire mesh sheet which has been previously laid in the pipe ditch and urges said mesh into a tubular formation prior to embedding same between the inner and outer surfaces of the concrete pipe; to provide an apparatus and method in which the concrete or pipe forming material is compacted and compressed to a high density during the pipe formation so as to insure sufficient strength for retaining a tubular shape during the setting up period; to provide a method for continuously forming pipe in a previously excavated ditch which includes the steps of urging wire mesh sheet into cylindrical form and inserting same into the pipe matrix; and to provide such a machine and method which is practical and reliable and effective for the purpose intended.

Other objects and advantages of this invention will become apparent from the following description taken in connection with the accompanying drawings wherein are set forth by way of illustration and example certain embodiments of this invention.

FIG. 1 is a side elevation of the apparatus of this invention positioned in a ditch and extruding monolithic concrete in pipe form.

FIG. 2 is a sectional view through the apparatus taken on the line 2—2, FIG. 1, showing the apparatus in plan view, with parts removed.

FIG. 3 is a side elevation partly in section showing the relationship of the rotating head and the concrete being compacted thereby.

FIG. 4 is a sectional view through the apparatus showing the auger for delivering concrete to the head.

FIG. 5 is a sectional view through the concrete pipe taken on the line 5—5, FIG. 3, showing the brushes for coating the finishing material on the interior of the pipe.

FIG. 6 is a sectional view through the apparatus taken on the line 6—6, FIG. 3, showing the interior of the head and the feed pipes.

FIG. 7 is a sectional view through the apparatus taken on the line 7—7, FIG. 3, showing the concrete hopper and drive means for the concrete auger.

FIG. 8 is a sectional view through the apparatus taken on the line 8—8, FIG. 3, showing the entrance to the concrete feed pipes and the concrete compacting rollers.

FIG. 9 is a detailed view of a spring-loaded compacting roller.

FIG. 10 is a detailed view, partly in section, of a canted compacting roller.

FIG. 11 is a detailed sectional view taken on the line 11—11, FIG. 4, showing the interior of the finishing compound hopper.

FIG. 12 is a side elevation showing the wire mesh sheet being urged from an elongaed U-shaped into a tubular structure by the apparatus, said apparatus being shown in phantom.

FIG. 13 is a perspective schematic view showing the forming rings of the apparatus urging the reinforcing wire into a tubular structure for insertion into the concrete.

FIG. 14 is a detailed sectional view through the head of the apparatus taken on the line 14—14, FIG. 3, showing the curved leading edge of a trowel.

Referring more in detail to the drawings:

The reference numeral 1 indicates generally an elongated pipe forming apparatus used with the method of forming pipe, said apparatus and method comprising this invention. The apparatus 1 is adapted to produce continuous or monolithic wire reinforced concrete pipe in a previously excavated ditch 2, said ditch having a substantially semi-cylindrical bottom portion 3. The ditch 2 is formed with substantially horizontal lateral ledges 4 at the upper edges of the semi-cylindrical ditch bottom portion 3 and extending parallel thereto.

The apparatus 1 comprises an elongated frame 5 adapted for movement in and along the ditch 2. The frame 5 has secured on opposite sides thereof a pair of laterally extending spaced guide runners 6 adapted to contact the ledges 4 to support the forward portion 7 of the frame 5 in a position spaced above the semi-cylindrical portion 3 of the ditch 2.

A semi-cylindrical elongated shell 8 is secured to the rear portion 9 of the frame 5 and is adapted to support and guide the rear 10 of the apparatus 1 in the ditch 2 for movement therealong. A tapered and rolled lip 11 guides the rear 10 of the apparatus over small obstructions such as stones which have not been removed from the ditch 2. It is noted that in operation the apparatus moves in a direction toward the rear 10 thereof as indicated by the arrow in FIG. 1.

A conical-shaped head 12 is rotatably supported on the frame 5 by means of bearings 12 and 14 and is spaced above the cylindrical portion 3 of the ditch 2. The conical head 12 has the large diameter or base portion 15 thereof facing longitudinally forwardly of the frame 5 and is located at the forward portion 7 thereof. The axis of the head 12 is held co-extensive with the axis of rotation thereof and extending parallel to said frame and substantially equidistant between the spaced guide runners 6. The head 12 is supported by means of a hollow cylindrical neck section 16 which extends through the inner races of the bearings 13 and 14. A stationary sleeve 17 is contained within the neck section 16 to provide a suitable contacting surface for an auger 18 which transfers plastic material such as green concrete 18' toward the head 12 in a manner hereinafter described.

The stationary sleeve 17 opens into a pair of discharge tubes 19 and 20 which extend generally along the conical surface of the head 12 and terminate in radial outlets 21 and 22 respectively through which the concrete material may be deposited radially due to the centrifugal force developed by the rotation of the head 12. A sheave 23 is secured to the neck section 16 intermediate the ends thereof and carries a driven belt 24 thereon to induce the head rotation.

A hopper 25 is rigidly supported on the frame 5 adjacent one end of the sleeve 17 and contains the pipe forming material 18'. The auger 18 extends into the hopper 25 and the rotation of said auger induces the pipe forming material to travel through the sleeve 17 toward the discharge tubes 19 and 20. The auger 18 is supported on a longitudinally extending hollow shaft 26 which is rotatably supported by means of a ball bearing 27 at the rear end 27' thereof and a ball bearing 28 at the other end 28'. The bearing 28 is contained within the hollow head 12 to permit relative rotation between the head 12 and the shaft 26 without interference with the auger 18.

A finishing material container 29 is secured to the rear 10 of the apparatus and has a gear pump 30 contained therein for urging a finishing material 30' through the hollow pipe 26 to a dispenser 31 secured to the head 12 for rotation therewith. The dispenser 31 consists of a tubular structure 32 opening intermediate the ends thereof into the hollow interior of the shaft 26 and containing nozzles 33 and 34 on the ends thereof for dispensing the finishing material on the interior surface 35 of the concrete pipe 36 for a purpose explained hereinafter. Brushes 37 and 38 are secured to the dispenser 31 adjacent the nozzles 33 and 34 and are adapted to rotate with the head 12 to brush the finishing material 30' evenly onto the interior surface 35 as the apparatus 1 moves longitudinally away from the formed concrete pipe 36. An O-ring seal 38' prevents the finishing material from leaking into the hollow head 12.

A sheave 39 is secured to the hollow shaft 26 intermediate the bearing 27 and hopper 25 and carries a driven belt 40 thereon for rotating the auger 18 at a suitable speed described hereinafter which may be independent of the speed of the rotation of the head 12. An additional sheave 41 is secured to a shaft 42 extending from the container 29 and carries a driven belt 43. The shaft 42 provides motive force for the gear pump 30 in said container. O-ring seals 44 and 45 are secured to the frame 5 adjacent the container 29 to prevent leakage of the finishing material 30' into the bearing 27 supporting the shaft 26 and a bearing 46 supporting the gear pump shaft 42. Additional O-rings 47 and 47' are respectively located between the head 12 and the shaft 26 and between the shaft 26 and the hopper 25 to contain the green concrete 18'.

A semi-circular top half form 49 of substantially the same internal diameter as the ditch semi-cylindrical portions 3 is secured to the frame 5 at the forward portion 7 thereof and spaced above the head 12. The axis of the form 49 is located substantially co-extensive with the axis of rotation of the head 12. Supporting struts 50 are secured between the form 49 and the frame 5 to maintain said form rigid and prevent excess deflection under pressure generated during the pipe formation.

Spring loaded compacting rollers 51 and canted compacting rollers 52 are rotatably supported on the conical portion of the head 12. The spring loaded rollers 51 exhibit a substantially cylindrical portion 53, a conical portion 54 and a cylindrical portion 55 of larger diameter than the portion 53 on the opposite side of the conical portion 54 (FIG. 9). The rollers 51 are supported with the axes thereof parallel to the axis of the head 12 upon shafts 56 extending therethrough. Helical springs 57 are urged against the rollers 51 in the direction toward the base portion 15 of the head 12. The helical springs 57 are maintained in a compressed condition against the rollers 51 by means of collars 58 adjustably retained on the shafts 56 by means of set screws 57'. The springs 57 permit the rollers 51 to be displaced longitudinally rearwardly of the head 12 in order to maintain pressure on the concrete matrix and also to permit passage over an obstruction without seriously shocking the apparatus and disturbing the pipe formation. The canted rollers 52 are rotatably supported on threaded shafts 59 set at an angle to the axis of the head 12 and secured thereto by suitable means such as nuts 60. Thick rubber-like coating 61 is provided on the cylindrical and conical surfaces of the rollers 51 and 52 for absorbing shock caused by stones or irregular concrete texture during pipe formation. The rollers 51 and 52 present peripheral surfaces extending radially outwardly of the greatest diameter of the head 12 and positioned to develop a conical section inverted to the conical form of the head 12 during rotation thereof which defines a portion of the leading edge of the pipe being formed. The surfaces 53 and 55 on the rollers 51 form or develop cylindrical sections of different diameters on each side of the conical section whereby concrete is first packed in a thin layer by the surfaces 55 and thereafter kneaded outwardly and forwardly by the surfaces forming the conical section and subsequently packed in greater thickness by the surfaces 53 in preparation for finishing as described hereinafter. The thin layer packing by the surfaces 55 also aids the passage of the concrete around the reinforcing sheet described hereinafter. The outlets 21 and 22 are located between rollers 51 and 52 whereby concrete is deposited directly in the path of the rollers.

It is common knowledge that concrete which is allowed to cure under moist conditions attains a higher ultimate strength than concrete which is dried rapidly. It is, therefore, advantageous to provide a roll 62 of suitable paper 62' which may be unrolled and guided beneath a guide roller 63 and deposited between the top half form 49 and the outside upper surface 64 of the concrete pipe 36. The paper 62' acts as a moisture barrier to prevent the rapid escape of moisture from the greater portion of the exposed pipe. The paper 62' also prevents direct contact between the outside upper surface 64 of the concrete pipe 36 and the top half form 49, thus permitting the relative movement therebetween without damage to the outside surface finish of the concrete.

A plurality of trowels 65 are secured to the head 12 at the largest diameter 66 thereof and describe a cylinder coincident with the interior surface 35 of the concrete pipe 36 during the head rotation. The trowels 65 exhibit a curved leading edge 67 which urges the green concrete 18' outwardly to smooth and compact the concrete matrix while forming the interior surface 35. The trowels 65 are secured to the head 12 by means of studs 68 extending through a receiving bore 69. A nut 70 engages the stud 68 for completing the installation. The trowels 65 may be removed and serviced or other troweling tools may be substituted therefor by merely removing the nut 70 through access holes 71 in the head 12 and then lifting the tool radially outwardly from the head 12.

A suitable prime mover such as a gasoline engine 72 is used to power the apparatus. The gasoline engine 72 rotates a sheave 73 through an overrunning clutch 74 of the type adapted to slip when the load thereon reaches a predetermined maximum, thus preventing damage to the apparatus in case of unexpected overload. The sheave 73 carries a driven belt 75 cooperating with a sheave 76 secured to a manifold shaft 77. The shaft 77 is rotatably supported on the frame 5 by means of suitable bearings 78 and 79 and has secured thereto sheaves 80, 81 and 82 which respectively cooperate with the driven belts 24, 40 and 43 described above for operating the apparatus. The sheaves 80, 81 and 82 may be substituted for similar sheaves of different diameters to control the relative speeds between the auger 18, the head 12 and the finishing material pump 30 as desired for variations in pipe wall thickness, concrete mix and consistency of the finishing material.

Longitudinally spaced rings or annular members 83 and 84 are respectively secured to the frame 5 adjacent the head 12 by suitable retaining bars 83' and 84' and operate as guide members to urge a wire reinforcing sheet 85 from a substantially U-shaped elongated condition in contact with the bottom and sides of the ditch 2 to a tubular or cylindrical shape 86 for embedding into the matrix of the concrete pipe 36 (FIG. 13). The concrete discharged by the tubes 19 and 20 passes through and around and covers the sheet 85 while the pipe 36 is being formed. It is preferable that the reinforcing sheet 85 be composed of transverse wires or rods 87 which are of greater cross sectional area than the longitudinal wire or rods 88 in order to provide substantial hoop strength for maintaining higher pressures in the concrete pipe, the longitudinal wires 88 acting primarily to maintain correct spacing for the transverse rods 87.

In operation, a relatively dry mix of fast drying concrete 18' is placed in the hopper 25, and a suitable finishing material 30', such as tar, varnish, paint or plastic or the like, is placed in the container 29. The auger 18 urges the cement toward the head 12 where, due to centrifugal force, it is expelled radially from the discharge tubes 19 and 20 against the top half form 49 and the cylindrical portion 3 of the ditch 2. The cement is compacted, compressed and kneaded outwardly and forwardly of the head 12 by the rollers 51 and 52 into a high density rough pipe formation, the conical section formed by the surfaces of the rollers 51 and 52 at 54 and 61 due to the rotation of the head 12 defining a portion of the leading edge of the pipe. The trowels 65 urge the cement into a finished annular formation having a smooth interior surface. The apparatus under most conditions may be propelled along the ditch by the reaction of the surfaces at 54 and 61 against the concrete pipe being formed. However, it is understood that if thin walled pipe is being extruded it may be necessary to provide auxiliary means to aid in moving the apparatus. Such means may include a device such as a powered endless track in contact with the ditch for urging the apparatus forwardly but with insufficient force to actually move the apparatus, thus depending upon a reaction against the pipe to initiate the movement thereof. The finishing material in the container 29 is urged by means of the gear pump 30 through the hollow shaft 26 to the finishing material dispenser 31 from which it is applied on the inside surface 35 of the concrete pipe 36 and smoothed thereon by the brushes 37 and 38.

The concrete pipe being formed may have the wire reinforcing sheet 85 embedded therein during formation by merely guiding it into position by means of the annular members 83 and 84, permitting the cement to be compacted therearound as the apparatus is moved along the ditch. If non-reinforced pipe is desired, the sheet 85 is simply omitted.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a pipe forming apparatus adapted to produce continuous concrete pipe in a ditch having a substantially semi-cylindrical bottom portion the combination of a frame movable in and along said ditch, means on said frame for guiding said apparatus in said ditch, a head rotatably supported on said frame, the axis of rotation of said head extending parallel to said ditch, a semi-cylindrical top half form of substantially the same diameter as the ditch bottom portion, said top half form being secured to said frame spaced above said head, a plurality of rollers rotatably supported on said head, said rollers presenting peripheral surfaces extending radially outwardly of said head and adapted to develop during said head rotation a section defining a portion of the leading edge of the pipe, and means for delivering concrete to said rollers.

2. In a pipe forming apparatus adapted to produce continuous concrete pipe in a ditch having a substantially semi-cylindrical bottom portion and lateral ledges formed at the upper edges of said bottom portion and extending parallel thereto the combination of; a frame movable in and along said ditch, said frame having a pair of laterally extending guide runners for contacting said ledges to support the forward end of said frame, a head spaced above said bottom portion and rotatably supported on said frame at said forward end, the axis of rotation of said head extending parallel to said ditch and substantially equidistant between said runners, a semi-cylindrical top half form of substantially the same diameter as the ditch bottom portion, said top half form being secured to said frame at said forward end and spaced above said head and with the axis thereof substantially co-extensive with said head axis, a plurality of rollers rotatably supported on said head, said rollers presenting peripheral surfaces extending radially outwardly of said head and adapted to develop during said head rotation a conical section defining a portion of the leading edge of the pipe, means for delivering concrete between said rollers, and a plurality of trowels secured to said head and describing a cylinder during said head rotation.

3. In a pipe forming apparatus adapted to produce continuous concrete pipe in a ditch having a substantially semi-cylindrical bottom portion the combination of an elongated frame movable in and along said ditch, means on said frame for guiding said apparatus in said ditch, a head spaced above said bottom portion and rotatably supported on said frame, the axis of rotation of said head and extending parallel to said ditch, a semi-cylindrical top half form of substantially the same diameter as the ditch bottom portion, said top half form being secured to said frame spaced above said head and with the axis thereof substantially co-extensive with said head axis, a plurality of rollers rotatably supported on said head, said rollers presenting peripheral surfaces extending radially outwardly of said head and adapted to develop during said head rotation a circular section defining a portion of the leading edge of the pipe, a plurality of trowels secured to said head and describing a cylinder during said head rotation, a hopper secured to said frame, means for transporting concrete from said hopper to the rear of said head, outwardly directed dispensing tubes secured to said head and communicating with the rear of said head for receiving the concrete and positioned whereby the centrifugal force developed by rotation of said head forces the concrete outwardly of said head and against said ditch bottom portion and said top half form and between said rollers, said rollers kneading and compacting and compressing the concrete outwardly and forwardly of said head.

4. The apparatus of claim 1 including spaced members carried by said frame for guiding a U-shaped elongated wire reinforcing sheet into a tubular shape for embedding in said concrete pipe.

5. The apparatus of claim 1 including means for dispensing a paper sheet between said top half form and the formed concrete pipe.

6. The apparatus of claim 1 wherein at least one of said rollers is resiliently mounted for deflection in a direction parallel to the axis of rotation of said head.

7. The apparatus of claim 1 wherein at least one of said rollers is mounted in a position canted to the axis of rotation of said head.

8. The apparatus of claim 1 including means for dispensing a finishing material on the interior of the pipe as it is formed.

9. The apparatus of claim 1 wherein said rollers present peripheral surfaces positioned to develop sections of different diameters for packing the concrete in subsequent layers.

References Cited in the file of this patent

UNITED STATES PATENTS

| | | |
|---|---|---|
| 1,117,466 | Wewerka | Nov. 17, 1914 |
| 1,838,546 | Halstead | Dec. 29, 1931 |
| 2,053,307 | Wilson | Sept. 8, 1936 |
| 2,520,199 | Butcher | Aug. 29, 1950 |
| 2,878,544 | Dilday | Mar. 24, 1959 |